United States Patent
Moeschen-Siekmann et al.

(10) Patent No.: US 9,447,843 B2
(45) Date of Patent: Sep. 20, 2016

(54) BELT OR BELT SEGMENT HAVING AN OPEN END AND ATTACHMENT DEVICE THEREFOR

(71) Applicant: ContiTech Transportbandsysteme GmbH, Hannover (DE)

(72) Inventors: Michael Moeschen-Siekmann, Noerten-Hardenberg (DE); Achim Huels, Barsinghausen (DE)

(73) Assignee: ContiTech Transportbandsysteme GmbH, Hamburg (DE)

( * ) Notice: Subject to any disclaimer, the term of this patent is extended or adjusted under 35 U.S.C. 154(b) by 77 days.

(21) Appl. No.: 14/266,132

(22) Filed: Apr. 30, 2014

(65) Prior Publication Data

US 2014/0230194 A1    Aug. 21, 2014

Related U.S. Application Data

(63) Continuation of application No. PCT/EP2012/068722, filed on Sep. 24, 2012.

(30) Foreign Application Priority Data

Nov. 9, 2011 (DE) .................. 10 2011 055 168

(51) Int. Cl.
| | |
|---|---|
| *B66C 1/18* | (2006.01) |
| *B66C 1/14* | (2006.01) |
| *B66C 1/12* | (2006.01) |
| *F16G 3/07* | (2006.01) |
| *F16G 3/00* | (2006.01) |
| *B29D 29/00* | (2006.01) |
| *B66B 7/08* | (2006.01) |

(52) U.S. Cl.
CPC .............. *F16G 3/07* (2013.01); *B29D 29/00* (2013.01); *B66B 7/085* (2013.01); *F16G 3/00* (2013.01); *Y10T 24/3987* (2015.01)

(58) Field of Classification Search
None
See application file for complete search history.

(56) References Cited

U.S. PATENT DOCUMENTS

| | | | |
|---|---|---|---|
| 2,566,262 A | | 8/1951 | Traxler |
| 3,018,128 A | * | 1/1962 | Nelson ............... B66C 1/18 24/122.6 |
| 2010/0092238 A1 | * | 4/2010 | Zavattieri .......... F16G 11/02 403/274 |

FOREIGN PATENT DOCUMENTS

| | | |
|---|---|---|
| FR | 1 300 135 A | 8/1962 |
| GB | 712 116 A | 7/1954 |
| GB | 720 017 A | 12/1954 |
| GB | 1 063 303 A | 3/1967 |

OTHER PUBLICATIONS

International Search Report dated Jan. 2, 2013 of international application PCT/EP2012/068722.

* cited by examiner

*Primary Examiner* — Jack W Lavinder
(74) *Attorney, Agent, or Firm* — Walter Ottesen, P.A.

(57) ABSTRACT

A belt or belt segment defines a longitudinal direction and includes a plurality of steel ropes arranged to be essentially mutually in parallel and to extend essentially in the longitudinal direction. The belt or belt segment has at least one open end whereat the steel ropes have respective rope segments extending outwardly therefrom. An attachment device is disposed at the open end and is attached to at least a portion of the rope segments via clamping.

5 Claims, 2 Drawing Sheets

BELT OR BELT SEGMENT HAVING AN OPEN END AND ATTACHMENT DEVICE THEREFOR

CROSS REFERENCE TO RELATED APPLICATIONS

This application is a continuation application of international patent application PCT/EP2012/068722, filed Sep. 24, 2012, designating the United States and claiming priority from German application 10 2011 055 168.9, filed Nov. 9, 2011, and the entire content of both applications is incorporated herein by reference.

FIELD OF THE INVENTION

The invention relates to a belt or a belt segment having steel cables running substantially in the longitudinal direction of the belt or belt segment and arranged substantially parallel to one another. The belt or the belt segment has at least one open end.

BACKGROUND OF THE INVENTION

Belts or belt segments which are used for lifting or pulling loads have been known for a long time. For this purpose, belts or belt segments can be used which have an open end on which the load to be lifted or to be pulled can be fastened. It is conventional here for the open end of the belt or belt segment to be guided as a loop around a part or part region of the load, such as, for example, a hook or the like.

Here, the loop is usually formed in such a way that the open end of the belt or belt segment is folded around the hook or the like, with the result that the open end bears on a part region of the belt or belt segment and the two regions are pressed onto one another there by clamping. This produces a frictional connection.

A disadvantage here is that, in very many applications, the belt or the belt segment is guided through a closed opening and only thereafter can the loop be formed. In these cases, the production of the clamping connection, which must be able to securely bear or pull the load, has to be carried out under, in some cases, very tight and poorly accessible conditions. This makes mounting more difficult and more expensive and increases the risk of an improperly executed clamping connection.

For example, belts of this kind can be used for lifting elevators. In that case, the loop has to be formed by producing the clamping connection, for example, inside the elevator shaft and setting up therein the corresponding assembly apparatus, which is intended in particular to produce the clamping. This makes assembly considerably more difficult.

SUMMARY OF THE INVENTION

It is an object of the invention to provide a belt or a belt segment of the type described above which can be mounted more simply and more quickly on a load or the like.

The belt or belt segment of the invention defines a longitudinal direction and includes: a plurality of steel ropes arranged to be essentially mutually in parallel and to extend essentially in the longitudinal direction; the belt or belt segment having at least one open end whereat the steel ropes have respective rope segments extending outwardly therefrom; and, an attachment device disposed at the open end and being attached to at least a portion of the rope segments via clamping.

Thus, the invention relates to a belt or a belt segment having at the open end an attachment device which is connected to at least one part of the steel cables by clamping.

The invention is based on the finding that the connection between the steel cables or a belt or belt segment and a further, preferably metallic, body can take place by means of clamping. For this purpose, the steel cables can be inserted into corresponding openings of the further body. These openings are then compressed from outside such that their diameter or cross section is narrowed in such a way that a frictional clamping connection results between the body and the steel cables. This can transfer 100% of the cable breaking load.

It is advantageous that, in this way, a body can be provided under, for example, workshop conditions on the open end of the belt or belt segment and this belt or this belt segment can then be simply and rapidly assembled on a load, system or the like during mounting by means of this body. Thus, the body can preferably have as attachment device, for example, a hook or a cutout which, during assembly, merely has to be inserted into a corresponding hook or a suspension in order to attach the belt or the belt segment to the load or the like. The cutout can also be fastened via a screw connection or rivet connection or the like to a load or the like. In the event of damage to the belt or belt segment, the latter can also be interchanged quickly and simply. The clamping force when forming a loop is limited.

Furthermore, the region which is required to produce the connection can be provided to be considerably smaller and with a lower overall height, in particular in the longitudinal direction of the belt or belt segment, since such a clamping connection takes up less space than the formation of a loop, eye or the like.

In all cases, the assembly or the exchange of the body, in particular as an attachment device, can take place under readily accessible, illuminated and clean conditions. The clamping connection can also be checked in terms of its hold before mounting on the load. During subsequent mounting of the belt or belt segment thus equipped on the load or the like, only hooking in, screwing on or the like has to take place, with the result that this connection can occur quickly, simply and reliably under the most unfavorable and poorly accessible conditions.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
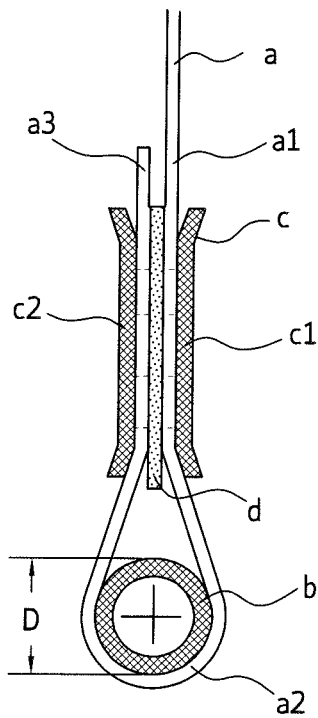
FIG. 1 is a schematic representation of a conventional attachment of a belt with an open end to a cylindrical body.

FIG. 1 shows a schematic representation of a conventional attachment of a belt (a) having an open end to a cylindrical body (b). The open end of the belt (a) is in this case guided around the cylindrical body (b). In this case, the belt (a) bears with its region a2 on a region of the cylindrical body (b). The open end of the belt here projects with its region a3 beyond the cylindrical body (b) in such a way that the region a3 can be joined together with a region a1 of the belt. The regions a1 and a3, which make flat contact with one another, are then pressed against one another with a clamping device (c), with the result that the regions a1 and a3 produce a frictional connection and the open end of the belt (a) forms a loop a2 about the cylindrical body. For this purpose, the clamping device (c) can have two clamping elements c1 and c2 which in each case act from outside on the regions a1 and a3 which make flat contact with one another. Between the regions a1 and a3 there can be provided a friction element (d) which improves the friction between the regions a1 and a3 and thereby increases the frictional engagement.

Figure 2:
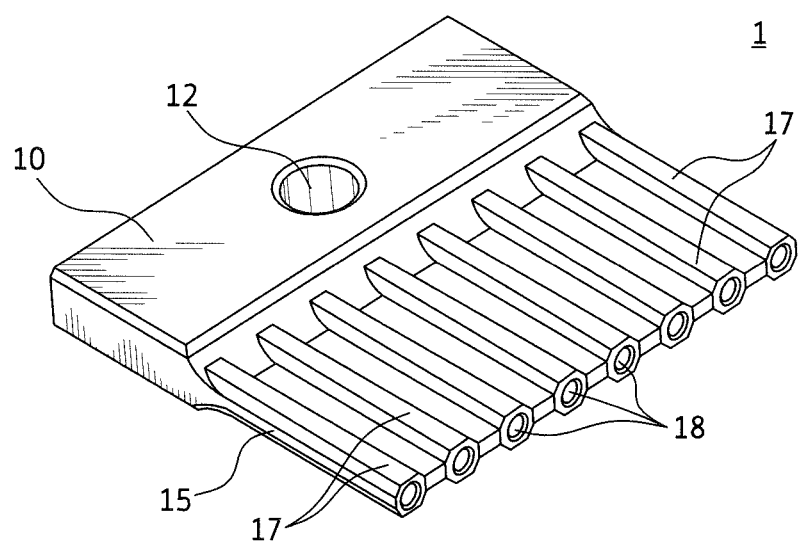
FIG. 2 shows a perspective schematic representation of an attachment device according to the invention.

FIG. 2 is a perspective schematic representation of an attachment device 1 according to the invention. The attachment device 1 has a first part region 10 which can also be referred to as a head piece 10 of the attachment device 1. This part region is connected to a second part region 15 which can also be referred to as a clamping piece 15 of the attachment device 1. The head piece 10 and the clamping piece 15 are interconnected and configured in such a way that they can reliably transfer the forces between a load and a belt or belt segment 2. Preferably, the head piece 10 and the clamping piece 15 are provided in one part, that is, produced solidly from one body.

The head piece 10 has a connecting element 12 which can be, for example, a hook or the like. In the embodiment represented, the connecting element 12 is a cutout 12 which runs perpendicularly to the longitudinal direction of the steel cables 25 of the belt or belt segment 2 and perpendicularly to the plane of the belt or belt segment 2 (see FIGS. 3 and 4). By means of this cutout 12, which can also be referred to as an opening 12 or through hole 12, the head piece 10 of the attachment device 1 can be suspended in a hook or a projection of a load or also on a holder or be screwed onto a load or holder.

The clamping piece 15 has a clamping device (17, 18) which, in the embodiment represented, includes a plurality of clamping webs 17. Each clamping web 17 has at least one longitudinal bore 18. The steel cables 25 of the belt or belt segment 2 are inserted into corresponding ones of the longitudinal bores 18. In this state, a force is applied on the clamping webs 17 from outside, with the result that the diameter or cross section of the bores 18 is narrowed in such a way that a force-tight clamping connection results between the interior of the bores 18 and thus between the clamping webs 17 and the steel cables 25.

Figure 3:
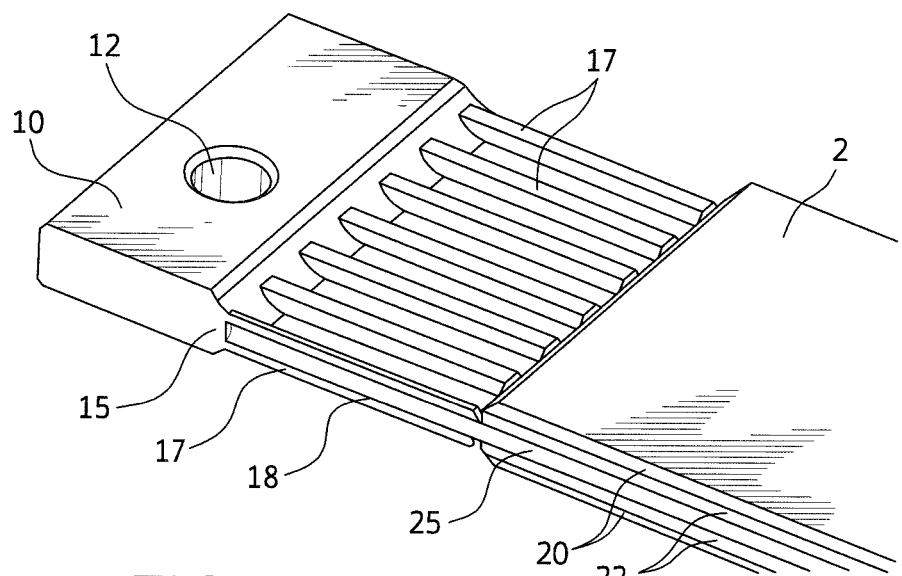
FIG. 3 shows a perspective schematic representation of a belt or belt segment according to the invention with an attachment device, cut open in the longitudinal direction; and, FIG. 4 shows a perspective schematic representation of a belt or belt segment according to the invention with an attachment device viewed from outside.
Figure 4:
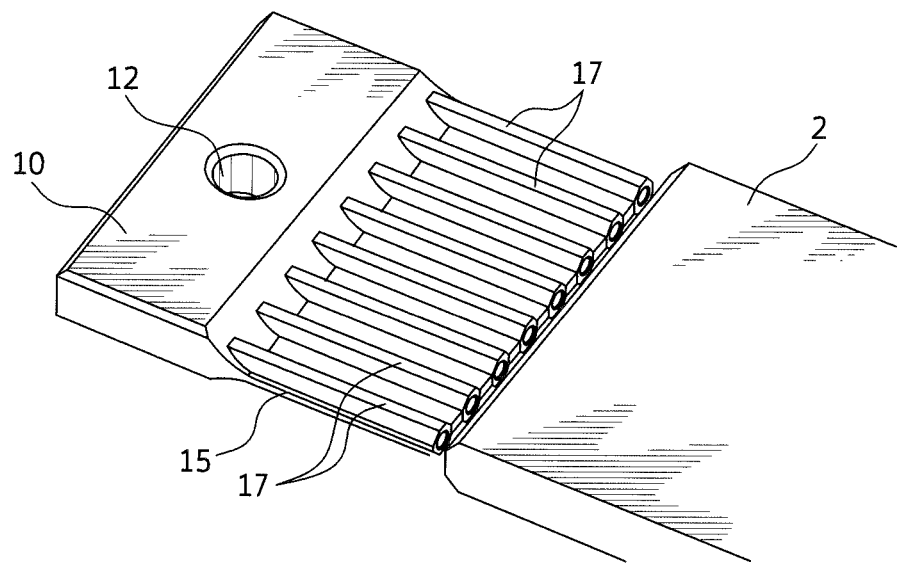

FIG. 3 shows a perspective schematic representation of a belt or belt segment 2 according to the invention with an attachment device 1, cut open in the longitudinal direction. FIG. 4 shows, from outside, a perspective schematic representation of a belt or belt segment 2 according to the invention with an attachment device 1.

It can be seen in this view that the steel cables 25 project from the open end of the belt or belt segment 2 in the longitudinal direction. This region of the steel cables 25 is used to attach the belt or belt segment 2 to the attachment device 1 in that this region of the steel cables 25 is inserted into the bores 18 of the clamping piece 15 and clamped therein by pressing the clamping webs 17.

Preference is given to using a belt or belt segment 2 which contains an elastomeric material 22 in which the steel cables 25 are embedded as reinforcing elements. It is particularly preferred if this elastomeric belt or this elastomeric belt segment 2 has an elastomeric covering layer 20 on at least one surface side, in particular both surface sides. In this way, the elastomeric covering layer 20 can be formed in such a way that it is as resistant as possible to external influences, and the elastomeric core layer 22 is formed in such a way as to ensure as good an attachment as possible to the steel cables 25.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
a belt or belt segment according to the prior art
a1 first region of the belt (a), clamping region
a2 second region of the belt (a), loop
a3 third region of the belt (a), clamping region
b cylindrical body
c clamping device
c1 first clamping element
c2 second clamping element
d friction element
1 attachment device
10 first part region or head piece of the attachment device 1
12 connecting element or cutout of the head piece 10
15 second part region or clamping piece of the attachment device 1
17 clamping device or clamping webs of the clamping piece 15
18 clamping device or longitudinal bores of the clamping piece 15
2 belt or belt segment
20 rubber covering layer, top and bottom
22 core rubber layer
25 steel cables, if appropriate as reinforcing elements.

What is claimed is:

1. A belt assembly comprising:
   a belt made of elastomeric material and defining a longitudinal direction;
   said belt having a plurality of steel ropes embedded in said elastomeric material and being arranged mutually in parallel in said belt and extending essentially in said longitudinal direction;
   said belt having a longitudinal end face and said steel ropes having respective end segments extending from said belt at said end face in said longitudinal direction;
   an attachment device including a first portion and a second portion;
   said first portion having a connection element configured to coact with a corresponding connecting element;
   said second portion being a clamping unit having a plurality of openings formed therein for accommodating corresponding ones of said end segments therein; and,
   said end segments being frictionally clamped in said openings so as to tightly connect said attachment device to said belt.

2. The belt assembly of claim 1, wherein each of said openings is a bore having a cross section which is narrowed so as to cause the frictional clamping of said end segments in said clamping unit.

3. The belt assembly of claim 2, wherein said connecting element is configured as a cutout formed in said first portion.

4. The belt assembly of claim 2, wherein said first and second portions of said attachment device conjointly define an integral body.

5. The belt assembly of claim 2, wherein said attachment device is an essentially flat member with said second portion having an overall height less than said first portion measured perpendicularly to said longitudinal direction.

\* \* \* \* \*